United States Patent [19]
Gillette et al.

[11] 3,795,149
[45] Mar. 5, 1974

[54] METHOD AND APPARATUS FOR SUPPLYING SAMPLES FOR AUTOMATED ANALYSIS

[75] Inventors: William H. Gillette, Deer Park, N.Y.; William J. C. McCandless, Ringwood, N.J.; Kent M. Negersmith, Carmel, N.Y.

[73] Assignee: Technicon Instruments Corporation, Tarrytown, N.Y.

[22] Filed: Oct. 15, 1971

[21] Appl. No.: 189,673

[52] U.S. Cl. .............................. 73/423 A, 210/391
[51] Int. Cl. ............................................. G01r 1/12
[58] Field of Search .................... 73/423 A; 210/391

[56] References Cited
UNITED STATES PATENTS
1,398,205  11/1921  Sirch .............................. 210/391 X
3,252,330  5/1966  Kling .............................. 73/423 A
3,430,497  3/1969  Tenczar .......................... 73/423 A Primary Examiner—S. Clement Swisher
Attorney, Agent, or Firm—S. P. Tedesco; S. E. Rockwell

[57] ABSTRACT

Liquid from a liquid sample container is flowed in automated analysis apparatus into a filter-equipped inlet end of a probe while the latter is immersed in the liquid, for transport of the sample to automated analysis. The probe is subsequently removed from the container and immersed in the liquid of a wash receptacle. Prior to immersion in another liquid sample, a fluid, other than sample, is flushed through the aforementioned filter in a reverse direction to cleanse it of particulate matter, the flushing being in timed relation to the movements of the probe.

13 Claims, 5 Drawing Figures

METHOD AND APPARATUS FOR SUPPLYING SAMPLES FOR AUTOMATED ANALYSIS

BACKGROUND OF THE INVENTION

1. Field of the Invention

This invention relates to method and apparatus for supplying samples for automated analysis, utilizing a sample probe with a filter-equipped inlet and employing a technique for the reverse flushing of the probe filter to remove particulate matter therefrom.

2. Prior Art

Apparatus for the continuous analysis of fluids are well known. Such an apparatus is disclosed in Skeggs U.S. Pat. No. 2,797,149 issued June 25, 1957. Skeggs U.S. Pat. No. 2,879,141 issued Mar. 24, 1959 discloses analysis apparatus of an automated type in which samples are fed in a flowing stream by means of a take-off device which aspirates liquid from each of a plurality of sample containers which are sequentially presented thereto by a sampler assembly. Such apparatus is commonly employed for the analysis of various fluids. Skeggs et al U.S. Pat. No. 3,241,432 issued Mar. 22, 1966 discloses automated apparatus for performing multiple quantitative analyses on different portions of a single sample, each analysis being for a different specific sample constituent. As shown in the last-mentioned patent by way of example, such automated analysis apparatus may include for analysis purposes a colorimeter for analysis of certain portions of a sample and/or a spectral-flame photometer for analysis of one or more other sample portions. However, other conventional photometric devices may be used for analysis purposes in similar automated sample analysis apparatus.

In present-day continuous-flow analysis apparatus of this type, only a small quantity of sample may be employed for analysis purposes which sample flows in a take-off device at a relatively slow rate of, say, 1.5 ml/min. for example. The sample conduit and other conduits employed in such apparatus extending from the take-off device to the point of analysis may be relatively small. By way of example only, the internal diameter of the sample inlet conduit of a probe immersible in a liquid sample may have an internal diameter of approximately .033 inch. Such a conduit may become clogged during a series of tests on such equipment and necessitate the shut-down of the system to clear the conduit. Such clogging or other interference from debris may be the result of foreign matter in the sample or may be due to the existence in the sample of a naturally occurring substance such as a clot in a whole blood sample.

While reverse flushing of continuous analysis apparatus for the purpose of improving analysis is known as shown and described in Isreeli U.S. Pat. No. 3,511,573 issued May 12, 1970, the flushing in accordance with the last-mentioned patent is of a flow cell to achieve better wash of the cell between samples. The present invention deals not with wash problems as such but with the elimination or effective restriction of particulate matter of an undesirable nature entering such apparatus, which particulate matter may accumulate and interfere with analysis and eventually cause clogging of one or more conduits in the apparatus.

SUMMARY OF THE INVENTION

It is an object of the invention to provide an improved method and apparatus for supplying samples for automated analysis. In accordance with the invention liquid from a liquid sample container is flowed in automated analysis apparatus into a filter-equipped inlet of a probe while the latter is immersed in the liquid, for transport of the sample to automated analysis. The probe is subsequently removed from the container and immersed in the liquid of a wash receptacle. Prior to immersion in another liquid sample, a fluid, other than sample, is flushed through the aforementioned filter in a reverse direction to cleanse it of particulate matter. The flushing is in timed relation to the movements of the probe.

Another object is to provide in such apparatus a sample probe having an improved inlet structure. Further objects of the invention will be apparent from the following detailed description of the presently preferred embodiment of the invention.

DESCRIPTION OF THE PREFERRED EMBODIMENT

Figure 1:
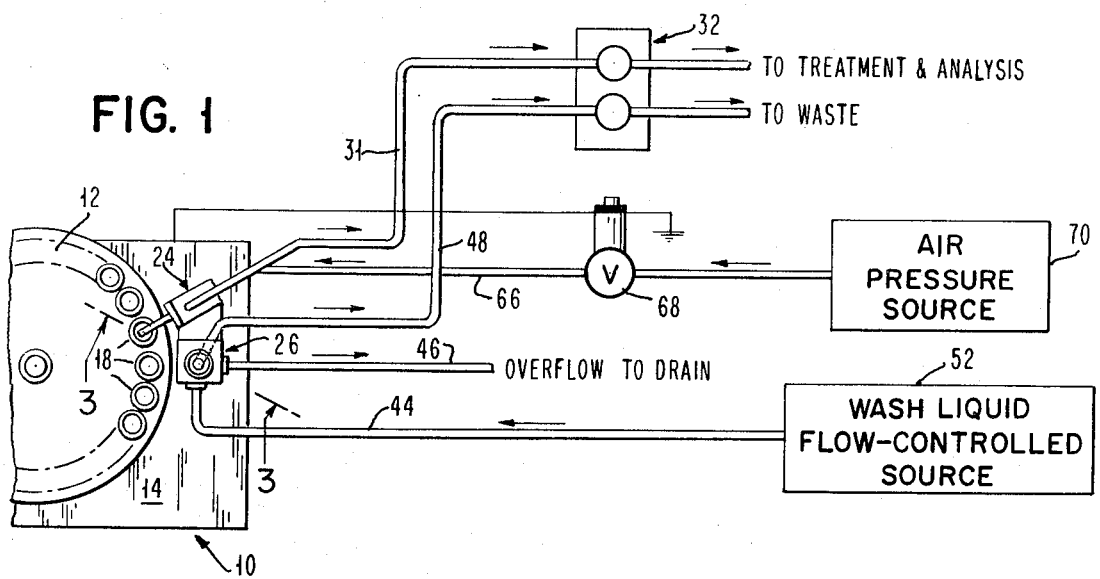
FIG. 1 is a somewhat diagrammatic view of apparatus for supplying samples for automated analysis and embodying the invention.
Figure 3:
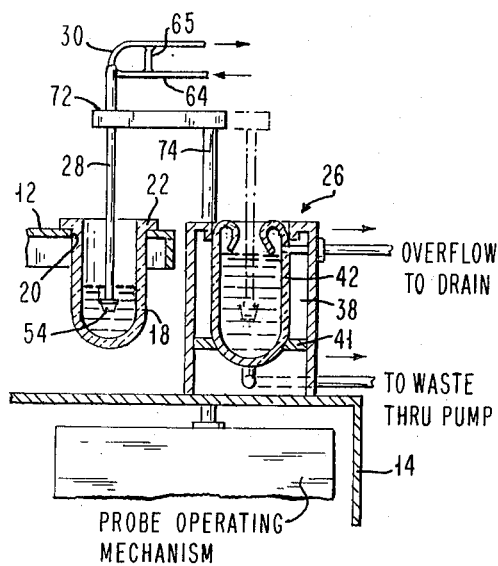
FIG. 3 is an enlarged sectional view taken on line 3—3 of FIG. 1.

In the drawings, there is shown a sampler, indicated generally at 10, which, briefly described, comprises a carrier here shown as a turntable 12 which is intermittently turned by a suitable mechanism disposed within a housing 14, which mechanism may conveniently take the form of that shown and described of Isreeli U.S. Pat. No. 3,038,340 issued June 12, 1962. The turntable 12 is in the form of a rack which carries a series of removable containers 18, similar in form to test tubes, which are receptacles for the liquid samples, the containers 18 being disposed laterally of each other in a circular row. For this purpose, the turntable rack 12 is provided with a series of tube-receiving holes 20 circumferentially spaced apart in the turntable 12, and the tube-like sample receptacles 18 each have a flaring top 22 which rests on the margin of the turntable rack around the corresponding opening 20 through which each sample receptacle projects, as shown by FIGS. 1 and 3.

A take-off device, indicated generally at 24, and which includes a probe, is mounted on top of the housing 14 laterally of the turntable 12 and laterally of a stationary receptacle, indicated generally at 26, which provides a wash liquid for the liquid samples. The take-off device is mounted for movement laterally to positions above a sample tube 18 at the take-off station and the receptacle 26, respectively, and is also movable up and down in the last-mentioned positions into and out of the last-mentioned sample tube 18 and receptacle 26, respectively, for withdrawing the corresponding sample and wash liquid.

The take-off device 24 includes a tubular or sheath member 28 through which a take-off tube 30 of the probe extends for connection by tube 31 to pump 32 (FIG. 1) of the analysis apparatus for aspiration of the sample liquid and wash liquid from the sample tube 18 and receptacle 26, respectively. It is to be noted that in the up or retracted position of the take-off device, the inlet end 36 (FIG. 5) of the take-off tube 30 is exposed to the air so that, if left in this position for any length of time, the take-off device is operative to aspirate air through operation of the pump 32, whereby on sampling a series of samples a stream of longitudinally spaced liquid samples is formed wherein the samples are separated from each other by intervening segments of the wash liquid and each of the segments of wash liquid is interposed between a pair of air segments.

However, it is presently preferred to transfer the take-off device rapidly in its movements between immersion in liquid sample and immersion in wash liquid so that there is little tendency for air from the atmosphere to be apirated directly through the inlet 36 the take-off tube 30 during these movements. The wash liquid segments are effective to cleanse the walls of the tubular passages of the analysis apparatus and prevent contamination of a sample by a preceding sample. This cleansing action is in addition to the cleansing action provided by any intervening air segments.

Figure 4:
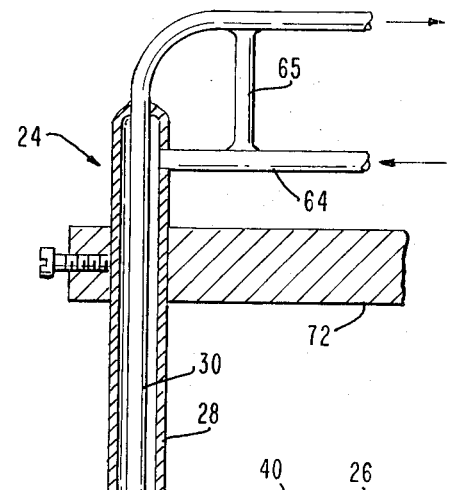
FIG. 4 is a further enlarged sectional view in elevation illustrating the probe in the wash receptacle of the apparatus.

As herein illustrated, the receptacle 26 for the wash liquid comprises a rectangular housing of a suitable material having a chamber 38 therein opening through the top of the housing, as at 40, and having a stationary apertured support member 41 therein extending horizontally and spaced upwardly from the bottom of the chamber 38. The last-mentioned housing supportingly receives in the chamber 38 through the opening 40 therein an upright tube 42 for wash liquid which is open at the top and has a rounded bottom as indicated in FIG. 4. The wash receptacle tube 42 has an inturned upper lip 43 around the opening thereof.

The wash receptacle tube 42 has a wash liquid inlet (not shown) opening laterally thereinto in the region of the lip 43 and connected to supply tube 44. The wash tube 42 also has in the region of the lip 43 a laterally opening tubular conduit 45 to receive overflow from the wash liquid tube 42 and connected for discharge to a tube 46 to carry such overflow to drain or waste by gravity.

As shown in FIG. 4, the wash receptacle tube 42 has the lower rounded end portion thereof extending through and supported by the aforementioned apertured support member 41. The lower end of the wash receptacle tube 42 is provided with a discharge outlet 47 connected by tube 48 to waste through the pump 32 which is of the peristaltic type. This construction and arrangement prevents a syphonic action of the wash liquid exiting from the wash receptacle tube 42 through the conduit 48 and enables the outlet 47, connected to the conduit 48, to be sufficiently large to avoid clogging of the outlet.

The overflow outlet 45 is preferably larger than the inlet supplied by tube 44 so that excess wash liquid is readily discharged through the outlet 45 at a faster rate than the flow of the wash liquid into the receptacle or tube 42 to prevent any overflow of wash liquid from the receptacle. Wash liquid, which may comprise water, is supplied to the wash receptacle or tube 42 through the tube 44 having an inlet end (FIG. 1) connected to any suitable pressurized source of water, such as a city water supply, and having a flow regulator connected thereto, such a flow-controlled source being indicated in FIG. 1 at 52.

Figure 5:
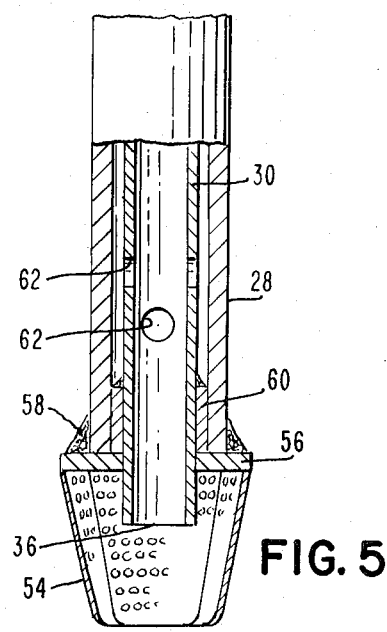
FIG. 5 is a further enlarged fragmentary view illustrating the inlet structure of the probe.

The take-off probe of the take-off device 24, which probe includes the take-off tube 30 extending axially within the sheath or tube 28, also includes a cup-shaped filter 54 extending over the inlet end 36 of the take-off tube 30. The filter 54 may be formed from a disc of stainless steel for example, which is suitably etched to provide filter holes therethrough and which is bent up to provide the cup shape best shown in FIG. 5. As shown in the last-mentioned view the inlet end 36 of the takeup tube extends a distance into the filter cup. The filter 54 surrounds the inlet 36 in the matter shown in the last-mentioned view to provide a superior filtering action. As previously indicated, the filter 54 is provided to eliminate or restrict particulate matter from entering the take-off tube inlet 36, which particulate matter might otherwise interfere with analysis or clog tubing. Also, as previously indicated, the tube 30 without the filter 54 is susceptible of clogging by particulate matter as it has a relatively small inner diameter, say on the order of approximately .033 inch for example. Other conduits might otherwise be clogged by particulate matter as well, that is, particulate matter from samples. The filter cup 54 may be supported as by having its rim brazed to a disc 56 having a central hole through which the inlet end 36 of the tube 30 extends so as to fill the hole as shown in FIG. 5.

As indicated in the last-mentioned view, the filter cup 54, joined to the disc 56 as aforesaid, may be supported by the latter from the outer tube or sheath 28 as by the disc 56 being soldered to the bottom of the sheath, as at 58. The disc 56 closes the bottom of the sheath 28. As shown, the lower end portion of the outer tube 28 may be spaced from the take-off tube 30 by a short tube section 60. Also, as shown, the outer diameter of the take-off tube 30 may be appreciably smaller than the inner diameter of the sheath or outer tube 28. Disposed a short distance above the tube section 60 is a pair of cross bores 62 in the tube 30 which bores 62 are spaced apart lengthwise of the tube 30 and extend completely therethrough, the cross bores being arranged in planes at right angles to one another. The cross bores 62 provide communication between the interior of the take-off tube 30 and the sheath or outer tube 28 for entry from the latter into the tube 30, in proximity to the inlet 36, of flushing fluid for the purpose of escape through the tube end 36 and reverse flushing of the filter 54 of particulate matter drawn previously thereon by aspiration of sample through the inlet 36.

As shown in FIG. 4, the take-off tube 30 extends through the closed upper end of the sheath or outer tube 28. Adjacent this end, there is provided a flushing fluid inlet tube 64 opening laterally into the outer tube 28. The upper end portion of the take-off tube 30 may be bent over so as to be laterally directed and a strut 65, in the form of a tube, may be interposed as shown between the tubes 30 and 64 and connected thereto as by soldering to provide support between the tubes 30 and 64. It is to be understood that the tubular strut 65 is not in communication with the passages of tubes 30 and 64. The offtake tube 30 has its outlet connected to the aforementioned tube 31 (FIG. 1) directed to the pump 32. The tube 64 has an inlet connected to supply tube 66 shown in FIG. 1.

Tube 66 supplies flushing fluid to the probe of the take-off device and, more specifically, deliveres this fluid under pressure to the interior of the sheath 28 under the control of a valve 68 (FIG. 1) interposed in the fluid line 66 intermediate of its inlet and outlet ends. The valve 68 may take any convenient form such as a pinch valve, by way of example, to occlude and alternately permit the opening of the tube 66. In such case, at least a portion of the tube 66 cooperating with the valve 68 would be of the compressible type. The valve 68 may be operated in any conventional mechanism and is here illustrated as a solenoid-operated valve which is energized and de-energized in timed relation to the movements of the take-off device 24 as by a conventional programmer (not shown) timing the movements of the take-off device 24 the operation of which will be described in more detail hereinafter.

The flushing fluid supplied by the tube 66 may be a liquid such as water for example. In the presently preferred embodiment the flushing fluid is constituted by a gas under pressure which, when the valve 68 is opened after the probe has been removed from a sample container 18, blows out the filter 54 to remove particulate matter therefrom in a reverse flushing operation. The use of gas provides a faster, more efficient cleansing of the filter 54 than use of a liquid, and the gas utilized, which is of an inert type, may conveniently take the form of air for example. To this end, the inlet end of supply tube 66 is connected to an air pressure source 70 which may take any convenient form. The source 70 may be constituted by a suitable air compressor, for example, but it will be obvious that the source 70 may be constituted alternatively by a container of pressurized fluid.

Figure 2:
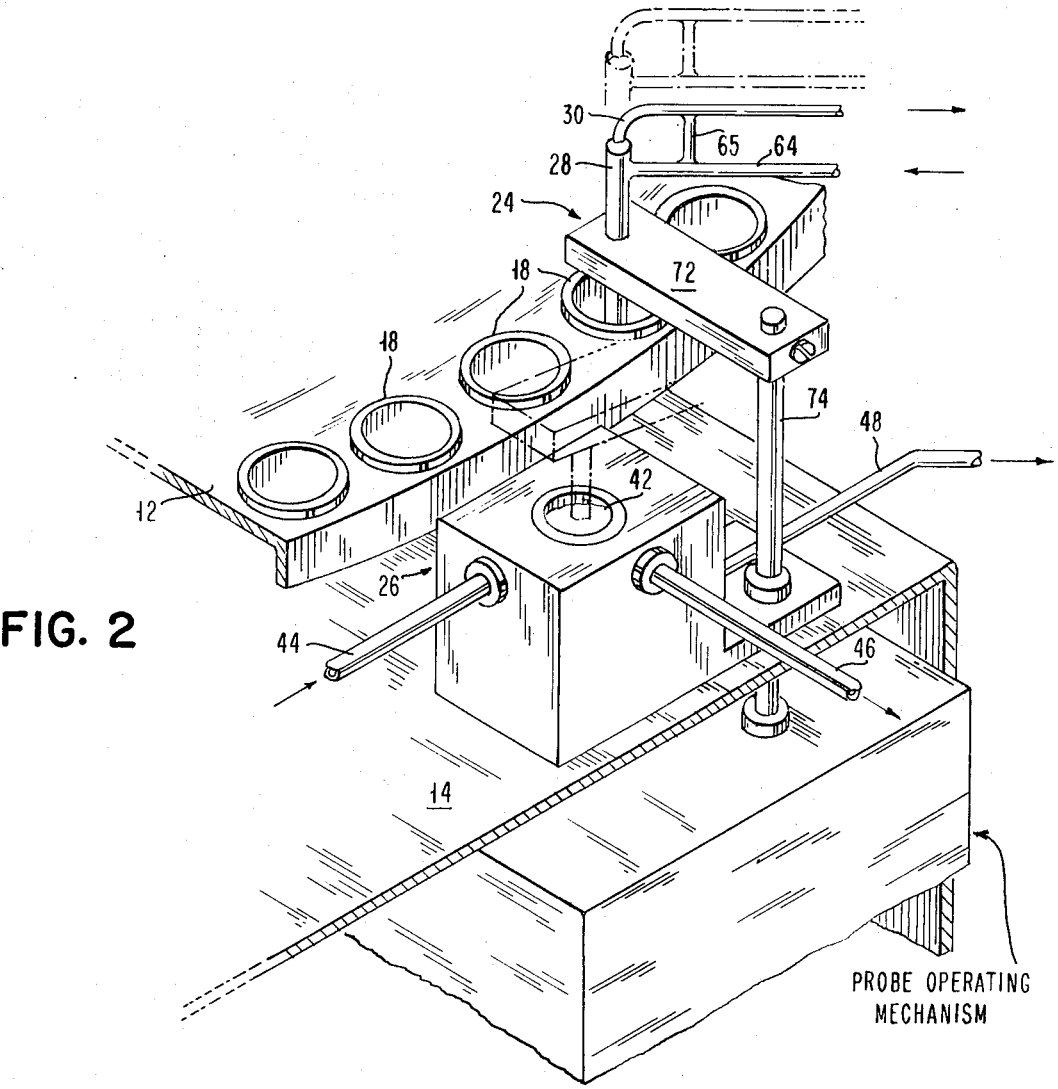
FIG. 2 is an enlarged fragmentary perspective view, partically in elevational section, illustrating a portion of the apparatus for supplying samples for automated analysis.

The off-take device 24, best shown in FIG. 2, comprises a horizontally extending arm 72 one end of which provides a rigid support for the vertically arranged probe including the sheath 28 to which it is secured. The other end of the arm 72 is rigidly supported on an upright shaft 74 extending into the housing 14, which shaft is axially and angularly moveable to effect the aforementioned movements of the probe. In the last-mentioned view the take-off device 24 is shown in phantom in raised or retracted position and the probe is shown in solid lines immersed in a sample container 18 at the aforementioned station at which sample is withdrawn by the probe. The last-mentioned view also indicates in phantom the position of the probe which it occupies when it is immersed in the wash receptacle 26.

In the illustrated form of the invention as shown in FIG. 4, reverse flushing of the filter 54 by the flushing fluid preferably takes place twice between immersions of the off-take device in successive samples, once while immersed in the wash liquid, and once as it leaves the wash liquid but prior to immersion in the next sample. Particularly the second flushing, while the take-off tube inlet 36 is suspended in the atmosphere, results in the flow of flushing gas upwardly in the take-off tube from the cross bores 62. This upwardly flowing gas forms a conduit cleaning bubble or segment in the stream passing toward analysis. The bubble or segment also serves the function of separating one sample from the next following sample in that it is interposed in the stream intermediate successive samples, thus effectively tending to maintain sample integrity.

The pump 32 is continuously operated, as previously indicated, so as to continuously apply suction to the take-off tube 30. Such suction may be sufficient to draw approximately 1.5 ml/min. of sample such as whole blood into the tube 30 when the tube is immersed in a sample and to also draw approximately the same volume of wash liquid when the tube 30 is immersed in the liquid of wash tube receptacle 42. Hence, the flushing fluid, to be effective, flows at a rate to exceed the intake in the tube 30, so that the flushing fluid is forced out the open end 36 of the tube and forced vigorously through the filter 54 to cleanse it. The outward flow of the flushing fluid from the tube end 36 may be in the order of five times the in-flow in the tube 36 or greater when gas is utilized as a flushing fluid.

The valve 68 when closed tends to create the formation of an air pocket in the sheath 28 which is resistant to the passage of liquid into the sheath 28 through the cross bores 62. On the other hand, when the valve 68 is closed as aforesaid, the passage of air from the sheath 28 through the cross bores 62 into the off-take tube 30 is effectively resisted by liquid flowing in the tube 30. Such cross bores 62 may be approximately .025 inch in diameter. The inner diameter of the sheath 28 may be approximately .071 inch as compared to the outer diameter of the tube 30 which may be approximately .049 inch. When the valve 68 is open there is a tendency for some air passing into the take-off tube 30 through the cross bores 62 to be connected upwardly therein along with wash liquid.

As previously indicated, the turntable 12 is rotated intermittently to present each sample container 18 in succession to the take-off device 24. During this rotary movement, the take-off device is in retracted position and aspirates air through the take-off tube 30. When a sample tube is carried into position and is under the inlet end 36 of the take-off tube, the take-off device is operated and moves downwardly so that the inlet end of the take-off tube is disposed in the liquid sample for withdrawing a portion of the sample therefrom.

After a portion of the sample is withdrawn by the take-off tube, the take-off device is operated and moves up into retracted position with the inlet end exposed to the atmosphere so that air is again aspirated through the inlet. The take-off device is then moved in its retraced position laterally, pivoting in a counter-clockwise direction as viewed in FIG. 2, to a position where the inlet end of the tube 30 is above and in alignment with the tube 42 of a wash receptacle 26. The take-off device then moves downwardly to immerse the inlet end of the take-off tube in the wash liquid in wash receptacle tube 42 for withdrawing a portion of the liquid therefrom and, while immersed in the last-mentioned liquid, the valve 68 is opened to effect reverse flushing of the filter 54 with flushing fluid to cleanse it in the aforesaid manner. The wash liquid in the tube 42 is continuously changed and overflow controlled as previously described.

After the aforementioned portion of the wash liquid is withdrawn and the valve 68 is closed, the take-off device moves upwardly into a retracted position in which air is again aspirated through the take-off tube. The take-off device is then moved laterally, pivoting in a clockwise direction as viewed in FIG. 2, until the inlet end of the take-off tube is positioned above the container 18 which contains the next liquid sample. It will be understood from the foregoing that the last-mentioned container was previously moved into position. Indexing movement of the plate 12 occurs when the take-off tube is removed from a sample container. The take-off tube or probe operating mechanism designated in FIG. 2, for providing the up and down and lateral movements of the take-off device through the shaft 74, may be similar to that described and illustrated in Ferrari U.S. Pat. No. 3,252,327 issued May 24, 1966.

The pump 32 may be of the peristaltic type including compressible tubes for the transport of fluid which tubes are compressed and occluded by a series of rollers carried by a pair of spaced apart sprocket chains, which rollers are spaced apart lengthwise of the compressible tubes. If desired, the sample tube, here illustrated as single tube 31, may be divided upstream of the pump 32 so that sample divisions may be carried through the pump in a corresponding number of compressible tubes. Also, if desired, compressible tubes may be employed in the pump to convey diluents and/or reagents to be added to the sample liquid. The pump 32 may be similar to that illustrated and described in Kling U.S. patent application Ser. No. 71,773 filed Sept. 14, 1970. It is to be noted that, if desired, pump 32 may be employed to supply flushing fluid to the probe in lieu of utilizing a separate fluid pressure source, such as the source 70. However, to achieve a large volume of flow of flushing fluid which is presently desired, plural interconnected compressible tubes to convey the last-mentioned fluid would normally be required in the pump 32. To avoid such pump tube use, it is presently preferred to utilize the separate air pressure source 70. Of course, it is appreciated that positive pressure pumping may be utilized, if desired, to provide both the flow of sample toward analysis and the air or other gas, such as nitrogen, for reverse flushing of the probe filter.

The sample may flow from the pump 32 to one or more photometric analysis stations and may be treated in various manners prior to flowing to analysis if desired. For example, such treatment and analysis is illustrated and described in Skeggs et al U. S. Pat. No. 3,241,432 issued Mar. 22, 1966.

While one embodiment of the method and apparatus for supplying samples for automated analysis has been illustrated and described, it will be appreciated, especially by those versed in the art, that the invention may take other forms and is susceptible to various changes in details without departing from the principles of the invention.

What is claimed is:

1. Apparatus for supplying samples for automated analysis comprising: a series of upwardly opening receptacles for different samples of a liquid, a dipping probe comprising a take-off tube for the passage of a stream of liquid under a pressure differential from each one of said receptacles sequentially toward analysis, means to move said probe relatively between successive ones of said sample receptacles, said take-off tube having a filter adjacent a sample inlet thereof to catch and remove particulate matter from the sample liquid entering said sample take-off tube, said probe comprising a filter-flushing conduit extending axially along at least a portion of the length of said take-off tube, having an outlet upstream of said filter and in proximity thereto for reverse flushing of the latter, said flushing conduit having an inlet for flushing fluid, a source of flushing fluid for delivery under pressure, and means coupled to and between said source and said flushing conduit inlet and including a valve intermittently supplying flushing fluid to said flushing conduit to cleanse said filter of particulate matter, said valve being operated to deliver flushing fluid to said outlet after removal of said probe from one sample receptacle and before entry into the next following sample receptacle in timed relation to said probe movements.

2. Apparatus for supplying samples for automated analysis as defined in claim 1, further including: a container for wash liquid, said probe moving means being operable to immerse the probe in the liquid of said wash liquid container between immersions in the samples of successive sample receptacles.

3. Apparatus for supplying samples for automated analysis as defined in claim 1, wherein: the sample inlet pressure in said take-off tube is created by continuously operating suction means in communication with a sample outlet in said take-off tube upstream of said sample inlet thereof, and the take-off tube inlet flow rate is substantially less than the flow rate of said flushing fluid.

4. Apparatus for supplying samples for automated analysis as defined in claim 1, wherein: said flushing conduit outlet is directed into said take-off tube in proximity to said sample inlet thereof.

5. Apparatus for supplying samples for automated analysis as defined in claim 1, wherein: said sample filter is of cup form, and said sample inlet is formed in an end of said take-off tube, said tube end extending a distance into said filter cup, said flushing conduit being formed as a tube in which said take-off tube extends axially, said take-off tube having a substantially smaller outer diameter than the inner diameter of said flushing conduit.

6. Apparatus for supplying samples for automated analysis as defined in claim 1, wherein: said flushing fluid is a gas.

7. Apparatus for supplying samples for automated analysis as defined in claim 2, further including regulated means for supplying said wash liquid to said wash receptacle, and controlled means for regulating the discharge of said wash fluid from said wash receptacle to waste, the filter being flushed in said wash receptacle.

8. Apparatus for supplying samples for automated analysis as defined in claim 2, wherein: said valve is operated in timed relation to said probe movements to flow said flushing fluid through said filter when said probe is immersed in the liquid of said wash receptacle.

9. A method for supplying samples for automated analysis employing a filter and a series of upwardly open receptacles for different samples of a liquid, comprising:
  flowing under pressure a stream of liquid from each one of said sample receptacles sequentially toward analysis in a take-off tube while filtering with said filter the sample liquid as it enters said tube to remove particulate matter,
  moving said take-off tube relatively between successive ones of said sample receptacles for immersion in the samples thereof, and introducing on plural occasions a flushing fluid other than said sample upstream of and in proximity to said filter in a direction opposite the direction of sample flow to remove particulate matter from said filter, after removal of said take-off tube from one sample receptacle and before entry into the next following sample receptacle.

10. A method for supplying samples for automated analysis as defined in claim 9, wherein: a receptacle of wash liquid is provided, said take-off tube being moved for immersion in the liquid of said wash receptacle between movements of said take-off tube into successive ones of said sample receptacles, said flushing fluid comprising a gas, said flushing taking place on one of said occasions in the liquid of said wash receptacle and on another occasion, when said take-off tube is not immersed, immediately prior to immersion of the take-off tube in the next sample.

11. Apparatus for supplying samples for automated analysis as defined in claim 1, wherein: said flushing conduit is formed as a tube and has said outlet thereof directed into said take-off tube.

12. Apparatus for supplying samples for automated analysis as defined in claim 11, wherein: said sample inlet is formed in an end of said sample take-off tube, and said sample filter is of cup-shape and extends over said sample inlet.

13. Apparatus for supplying samples for automated analysis as defined in claim 12, wherein: said sample take-off tube extends axially within said flushing tube and has an outer diameter less than the inner diameter of said flushing tube to form a flushing fluid passageway between said tubes.

* * * * *